United States Patent [19]
Broughton et al.

[11] 3,921,998
[45] Nov. 25, 1975

[54] AUXILIARY ATTACHMENT FOR SNOWMOBILES

[76] Inventors: Stanley A. Broughton, Rte. 13, Box 643A; Dennis K. Guenther, 5820 Estero Blvd., both of Fort Meyer Beach, Fla. 33931

[22] Filed: Oct. 23, 1973

[21] Appl. No.: 408,323

[52] U.S. Cl. .................................................. 280/19
[51] Int. Cl.² .......................................... B62B 15/00
[58] Field of Search ................. 280/19, 35; 180/5 R

[56] References Cited
UNITED STATES PATENTS

| | | |
|---|---|---|
| 3,563,562 | 2/1971 | Carlin .................................. 280/19 |
| 3,719,243 | 3/1973 | Losier .................................. 280/19 |
| 3,810,662 | 5/1974 | Command ........................... 180/5 R |

*Primary Examiner*—Robert R. Song
*Attorney, Agent, or Firm*—Theodore D. Lindgren

[57] ABSTRACT

An auxiliary attachment for use in towing disabled snowmobiles comprised of a ski or a pair of skis, upwardly extending structural members, braces, weight-bearing member, bolt, locking means and flexible cord. The attachment is designed to support the rear part of a disabled snowmobile in an elevated position during towing. The attachment is designed to be stored on the snowmobile while said attachment is in disassembled form. Assembly is easily performed at the site of disablement of the snowmobile.

3 Claims, 4 Drawing Figures

AUXILIARY ATTACHMENT FOR SNOWMOBILES

Background of the Invention

1. Field of the Invention

This invention relates to land vehicles of the type which are propelled over snow by a continuous track located below the rear center of said vehicles. More particularly, the invention relates to an auxiliary attachment for use in towing disabled snowmobiles from remote locations to repair facilities. Still more particularly, the invention relates to an auxiliary attachment for said snowmobiles which may be disassembled for compact storage on a snowmobile when said attachment is not in use.

2. Description of the Prior Art

U.S. Pat. Nos. 3,563,562 and 3,719,243 by Carlin and Losier, respectively, pertain to use of a sheet of metal or similar material which is placed under the track of a snowmobile for ease in towing. In each of the patents, the sheet of metal or similar material is rolled into the shape of a cylinder for storage on the vehicle.

It is virtually impossible to tow a disabled snowmobile over snow because of friction between the continuous track and the snow. Therefore, lacking some means for removing that friction, repairs must be made in remote places under conditions which are somewhat less than ideal. Using the device of this invention, a disabled snowmobile may be towed to warmer and otherwise more suitable location for repair.

Summary of the Invention

The subject invention is comprised of a skid or ski or pair of skis, to which are removably attached four upwardly extending structural members. The upwardly extending structural members are removably attached to and support a weight-bearing member and bolt, which are designed to attach to the rear towing hook or eye which is normally constructed as a part of a snowmobile. The height of the upwardly extending structural members is such that when the subject invention is in use the continuous track of the snowmobile is elevated above the snow. Horizontal brace members are attached between the front and rear upwardly extending structural members. A flexible cord is attached to the lower part of the upwardly extending structural members or to the front horizontal brace member. The opposite end of the flexible cord is secured to the lower front part of the snowmobile. The invention, and in particular the upwardly extending structural members, is designed to be rapidly assembled and disassembled and to combine when disassembled to form a compact storage packet.

Description of the Preferred Embodiments

Figure 1:
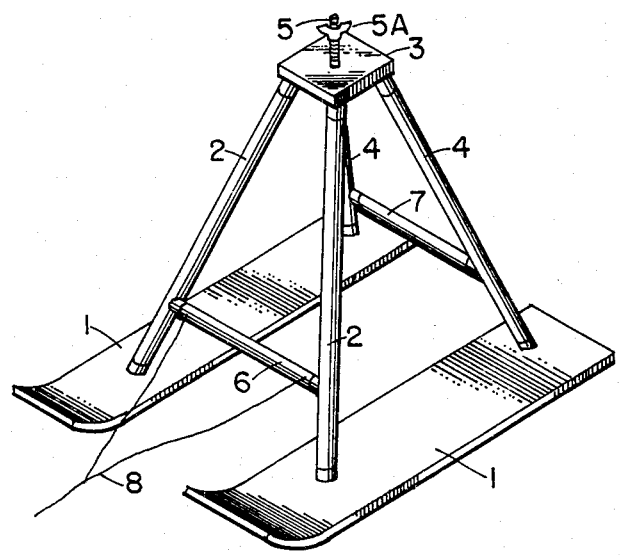
FIG. 1 is a perspective view of the preferred embodiment of the invention.

FIG. 1 shows the invention in its preferred embodiment. Skis 1 are of sufficient surface area to support in snow the weight of the invention and the weight of the snowmobile measured by the force required to elevate the rear part of the snowmobile. The surface area should be roughly equal to the surface area of the front steering skis of the snowmobile. Skis 1 may be constructed from metal, plastic or other rigid material. Skis 1 may be rigidly or foldably attached to form a tobbogan-like surface.

Front structural members 2 are removably attached to and extend upwardly from the front portions of skis 1, terminating at the upward end by removable attachment to weight-bearing member 3. Rear structural members 4 are removably attached to and extend upwardly from the rear portion of skis 1, also terminating at the upward end by removable attachment to weight-bearing member 3. Extending through or attached to weight-bearing member 3 is a bolt 5 upon which may be wing-nut 5A or other locking means. Weight-bearing member 3 is designed to support the rear hook or eye of the snowmobile.

Front brace member 6 is removably attached to and extends laterally and horizontally between the lower portions of front structural members 2. Rear brace member 7 is removably attached to and extends laterally and horizontally between the lower portions of rear structural members 4.

Flexible cord 8 is removably attached to front brace member 6 or to front structural members 2 near the point where front brace member 6 is attached to front structural members 2. Flexible cord 8 joins to form a single flexible cord for attachment to the front center of the snowmobile.

Figure 2:
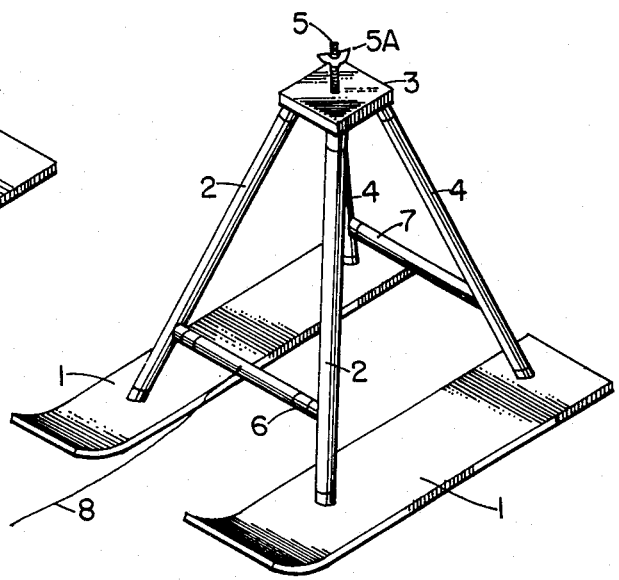
FIG. 2 indicates a second preferred embodiment of the invention in which guide members are utilized.

In another embodiment, indicated in FIG. 2, guide members 9 are pivotally attached to front brace member 6 or to front structural members 2. Guide members 9 extend forward from front brace member 6 and are joined to each other at their forward ends.

Flexible cord 8 is attached to said forward ends and is also attached to the forward center portion of the snowmobile.

Figure 3:
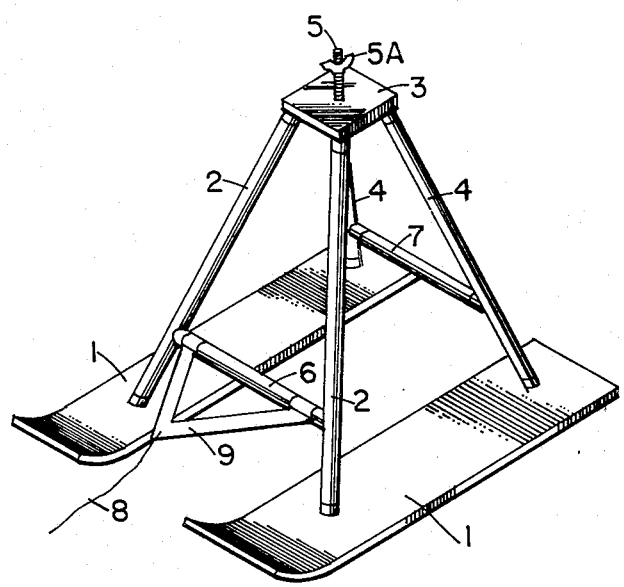
FIG. 3 indicates a third embodiment with alternate means for attaching the flexible cord member.

In another embodiment, indicated in FIG. 3, flexible cord 8 is attached to the center of front brace member 6 and to the forward center of the snowmobile.

Figure 4:
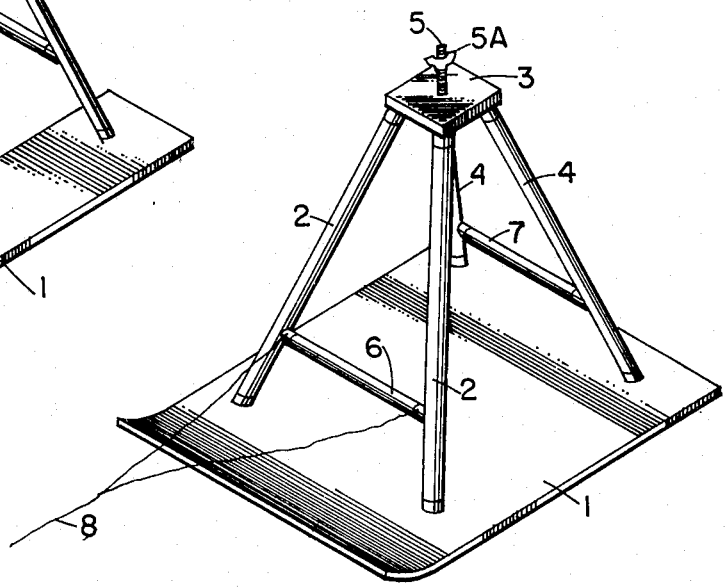
FIG. 4 indicates a fourth embodiment of the invention in which a single ski or skid is used.

FIG. 4 indicates an embodiment of the invention in which one ski or skid is used.

Removable attachment means may consist of but are not limited to pipe and sleeve arrangements, with or without set screws, springlocks, or threaded coupling. Combinations of the preceding means may be used. Construction of the structural members is not limited to metal or plastic pipe, but may be of extruded metal or plastic of various shapes.

It is obvious that the described invention may be constructed using various modifications of the type and arrangement of parts set forth herein, but that such modifications would not depart from the spirit and scope of the invention.

We claim:

1. An auxiliary attachment to enable the towing of disabled snowmobiles comprising a pair of parallel skis to which are removably attached four upwardly extending structural members, one of said structural members attached to the rear of each ski and one of said structural members attached to the front of each ski, a weight-bearing member removably attached to the upper ends of said structural members, a bolt with locking means extending upwardly through said weight-bearing member, rear brace member removably attached between the lower portions of the two rear structural members, front brace member removably attached between the lower portions of the two front structural members, a flexible and removably attached to the center of the front brace member.

2. The auxiliary attachment of claim 1 in which said flexible cord is attached to the front structural members at the point where said structural members are removably attached to said front brace member.

3. The auxiliary attachment of claim 1 in which said flexible cord is attached to a pair of guide members joined at the front and pivotally attached at the rear to said front brace member.

* * * * *